US012780090B2

(12) United States Patent
Muramatsu et al.

(10) Patent No.: US 12,780,090 B2
(45) Date of Patent: Nov. 3, 2026

(54) ILLUMINATED STEERING WHEEL WITH LIGHT GUIDE AND LENS MEMBER

(71) Applicant: TOYODA GOSEI CO., LTD., Kiyosu (JP)

(72) Inventors: Kazuma Muramatsu, Kiyosu (JP); Akitoshi Naganawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/422,585

(22) Filed: Dec. 17, 2025

(65) Prior Publication Data

US 2026/0175776 A1 Jun. 25, 2026

(30) Foreign Application Priority Data

Dec. 25, 2024 (JP) ................................ 2024-228409

(51) Int. Cl.
*B60Q 3/283* (2017.01)
*B60Q 3/64* (2017.01)

(52) U.S. Cl.
CPC ............... *B60Q 3/283* (2017.02); *B60Q 3/64* (2017.02)

(58) Field of Classification Search
CPC .......... B60Q 3/283; B60Q 3/64; B62D 1/046; B62D 1/04; B62D 1/06; B60K 35/88
See application file for complete search history.

(56) References Cited

U.S. PATENT DOCUMENTS

| | | | | |
|---|---|---|---|---|
| 11,180,079 | B2 * | 11/2021 | Marc | B60Q 3/283 |
| 11,390,211 | B2 * | 7/2022 | Kihara | B60Q 3/283 |
| 11,541,926 | B2 * | 1/2023 | Kojima | B60Q 3/283 |
| 12,024,226 | B2 * | 7/2024 | Sakakibara | B60Q 3/283 |
| 12,030,430 | B2 * | 7/2024 | Xu | B60Q 3/283 |
| 12,071,070 | B2 * | 8/2024 | Kim | B60Q 3/283 |
| 12,103,460 | B2 * | 10/2024 | Liang | B60Q 3/283 |
| 12,275,349 | B2 * | 4/2025 | Bertrand | B60Q 3/283 |
| 12,296,746 | B2 * | 5/2025 | Muramatsu | B60Q 3/283 |
| 12,330,555 | B2 * | 6/2025 | Miyata | B60Q 3/283 |
| 12,606,084 | B2 * | 4/2026 | Cibis | B60Q 3/283 |
| 2019/0016383 | A1 * | 1/2019 | Spencer | B60Q 3/283 |
| 2024/0067083 | A1 | 2/2024 | Bertrand et al. | |
| 2025/0083596 | A1 * | 3/2025 | Sagna | B60Q 3/283 |

* cited by examiner

*Primary Examiner* — Ismael Negron
(74) *Attorney, Agent, or Firm* — Posz Law Group, PLC

(57) ABSTRACT

The steering wheel includes a light source, a light guide member having a light passage portion and an emission end surface, a transmission suppression portion covering a side surface of the light passage portion, and a lens member for emitting the emitted light received from the emission end surface. A point on the optical axis of the light emitted from the light guide and on the emission end surface is farther from an intersection point of the second emission surface and the optical axis than an end of the transmission suppression portion along the optical axis direction.

13 Claims, 11 Drawing Sheets

ILLUMINATED STEERING WHEEL WITH LIGHT GUIDE AND LENS MEMBER

CROSS REFERENCE TO RELATED APPLICATIONS

The present application claims priority from Japanese patent application No. 2024-228409 filed Dec. 25, 2024, the disclosure of which is incorporated in its entirely by reference into the present application.

BACKGROUND

Field

This disclosure relates to a steering wheel.

Related Art

It has been proposed that a device that emits light such as visible light or infrared light (hereinafter, referred to as "illumination device") is mounted and used at a position visible from the driver in a steering wheel. For example, Japanese Patent Application Laid-open No. 2024-504591 discloses an steering wheel comprising a substrate in which a light source is provided, a diffuser which extends along the rim and constitutes an outer wall from which light is emitted, and an illumination device comprising a light guide member for directing light emitted from the light source to the diffuser. The diffuser is housed in a recess portion of the retainer, which is covered with a covering, such as leather.

In the steering wheel disclosed in Japanese Patent Application Laid-open No. 2024-504591, when a gap occurs due to assembly errors or aging, etc., in the fitting part of the leather and the diffuser covering the recess portion, a part of the light emitted from the light guide member is leaked from such a gap. Therefore, a steering wheel that can suppress the leakage of light emitted from the light guide member is desired.

SUMMARY

The present disclosure has been made to solve at least a part of the above-mentioned problems. The present disclosure is feasible in the following aspects.

According to one aspect of the present disclosure, a steering wheel is provided. The steering wheel may comprise a light source, a light guide member having a light passage portion that includes a first emission surface formed at an end of the light passage portion, guiding light output from the light source by the light passage portion, and emitting the light from the first emission surface, a transmission suppression portion suppressing a transmission of the light and covering a side surface of the light passage portion, and a lens member having transmissivity for emitted light emitted from the first emission surface, receiving the emitted light and having a second emission surface for emitting the emitted light outward. In a radial cross-section of the steering wheel, a position of the first emission surface in an optical axis direction along an optical axis of the emitted light may be farther from an intersection point of the second emission surface and the optical axis than a position in the optical axis direction of an end on a lens member side of the transmission suppression portion.

According to another aspect of the present disclosure, a steering wheel is provided. The steering wheel may comprise a light source, a light guide member having a light passage portion that includes a first emission surface formed at an end of the light passage portion, guiding light output from the light source by the light passage portion, and emitting the light from the first emission surface, a transmission suppression portion suppressing a transmission of the light and covering a portion of a side surface of the light passage portion, a lens member having transmissivity for emitted light emitted from the first emission surface, receiving the emitted light and having a second emission surface for emitting the emitted light outward, and an other member distinct from the light source, the light guide member and the transmission suppression portion, being contact with a peripheral portion of the lens member. In a radial cross-section of the steering wheel, a position of the first emission surface in an optical axis direction along the optical axis of the emitted light may be closer to an intersection point of the second emission surface and the optical axis than either a position in the optical axis direction of an end on a lens member side of the transmission suppression portion or a position of contact between the peripheral portion and the other member in the optical axis direction.

DETAILED DESCRIPTION

A. First Embodiment

Figure 1:
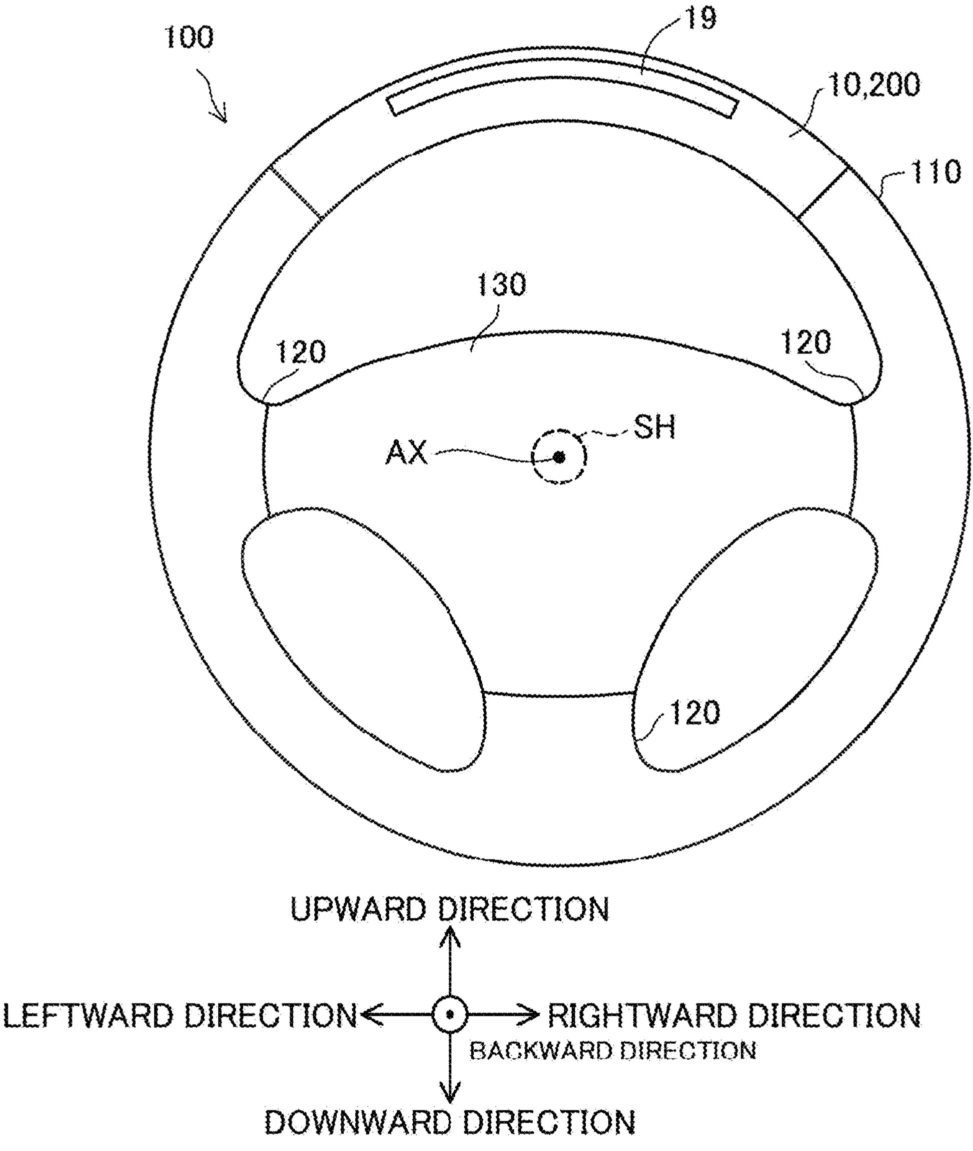
FIG. 1 is a plan view showing an external view of a steering wheel as an embodiment of the present disclosure.

A1. Overall Configuration of Steering Wheel 100:

FIG. 1 is a plan view showing the external form of a steering wheel 100 as an embodiment of the present disclosure. The steering wheel 100 is located in the driver's seat of a vehicle and is used. Examples of vehicle include engine-equipped vehicle, hybrid vehicle (HEV), plug-in hybrid vehicle (PHEV), electric vehicle (BEV), and fuel-cell vehicle (FCV). The steering wheel 100 is part of a steering device operated by the driver of the vehicle. FIG. 1, represents the steering wheel 100 in the condition where the steering wheel 100 is connected to as steering shaft SH in the vehicle and where the vehicle moves straight (hereinafter, referred to as "reference condition"). FIG. 1 further represents the external configuration of a side facing the driver in the steering wheel 100 (rear direction side described later) is represented. The steering wheel 100 is configured to be rotatable about an axis AX of the steering shaft SH. The revolution of the steering wheel 100 is transmitted to a steering gearbox (not shown) via the steering shaft SH.

In the present embodiment, the direction along the axis AX of the steering shaft SH is referred to as a "front-rear direction" (front direction and rear direction) in association with the traveling direction of vehicles. Among the directions perpendicular to the axis AX, the direction overlapping with the vertical direction (vertical upward and vertical downward) as viewed from the driver is called the "vertical direction". Among the directions perpendicular to the axis AX, the direction parallel to the lateral direction (width direction) of vehicles is referred to as the "lateral direction."

The steering wheel 100 comprises a ring-shaped gripping portion 110, a boss portion 130, three spoke portions 120, and an illumination device 200. The boss portion 130 is located generally at the center of the gripping portion 110. The illumination device 200 is disposed on a portion of the gripping portion 110.

The gripping portion 110 is grasped by the driver when the steering wheel 100 is operated. In the present embodiment, the shape of the gripping portion 110 is substantially annular shape. The central axis of the gripping portion 110 coincides with the axis AX of the steering shaft SH. The shape of the gripping portion 110, instead of the substantially annular shape, may be any shape such as a polygonal shape or an elliptical shape, also may be an asymmetrical shape such as a so-called D-shape. Furthermore, the shape of the gripping portion 110 is not limited to an annular, it may be any shape formed by a plurality of parts provided at a position apart from each other. As described below, the gripping portion 110 is configured that a plurality of members is superimposed in the thickness direction. The outermost layers are formed by an outer layer (an outer layer 80 described later) formed by the leather member. Although not shown in FIG. 1, a recess portion (a recess portion C1 to be described later) is formed on a portion of the upper part of the gripping portion 110 in the reference condition of the gripping portion 110. In the recess portion C1, a portion of the illumination device 200 to be described later is housed. In other words, the illumination device 200 fits into the recess portion C1. Then, the opening of the recess portion C1 is closed by the illumination device 200.

Three spoke portions 120 couple the gripping portion 110 and the boss portion 130. The boss portion 130 corresponds to the connecting point where the steering wheel 100 is connected to the steering shaft SH. The interior of the boss portion 130 houses a folded airbag and inflator, both not shown. The interior of the boss portion 130 further houses a temperature control circuitry constituting the heaters device, and various sensors for detecting a room temperature or a grip of the gripping portion 110 by user. The three spoke portions 120 and the boss portion 130 may be provided with various operating buttons for operating a navigation device or an audio device mounted on the vehicle.

The illumination device 200 emits light. In the present embodiment, the light emitted by the illumination device 200 is visible light and infrared light. By emitting visible light from the illumination device 200, various information can be informed to the driver. For example, it is possible to notify some information to the driver by emitting lights of various colors or by emitting a blinking light. Specifically, by emitting red light, it is possible to urge the driver to grasp the steering wheel 100. In addition, by emitting infrared light from the illumination device 200, a part of the driver's body can be captured neatly by infrared cameras in a dark vehicle interior at night.

Figure 2:
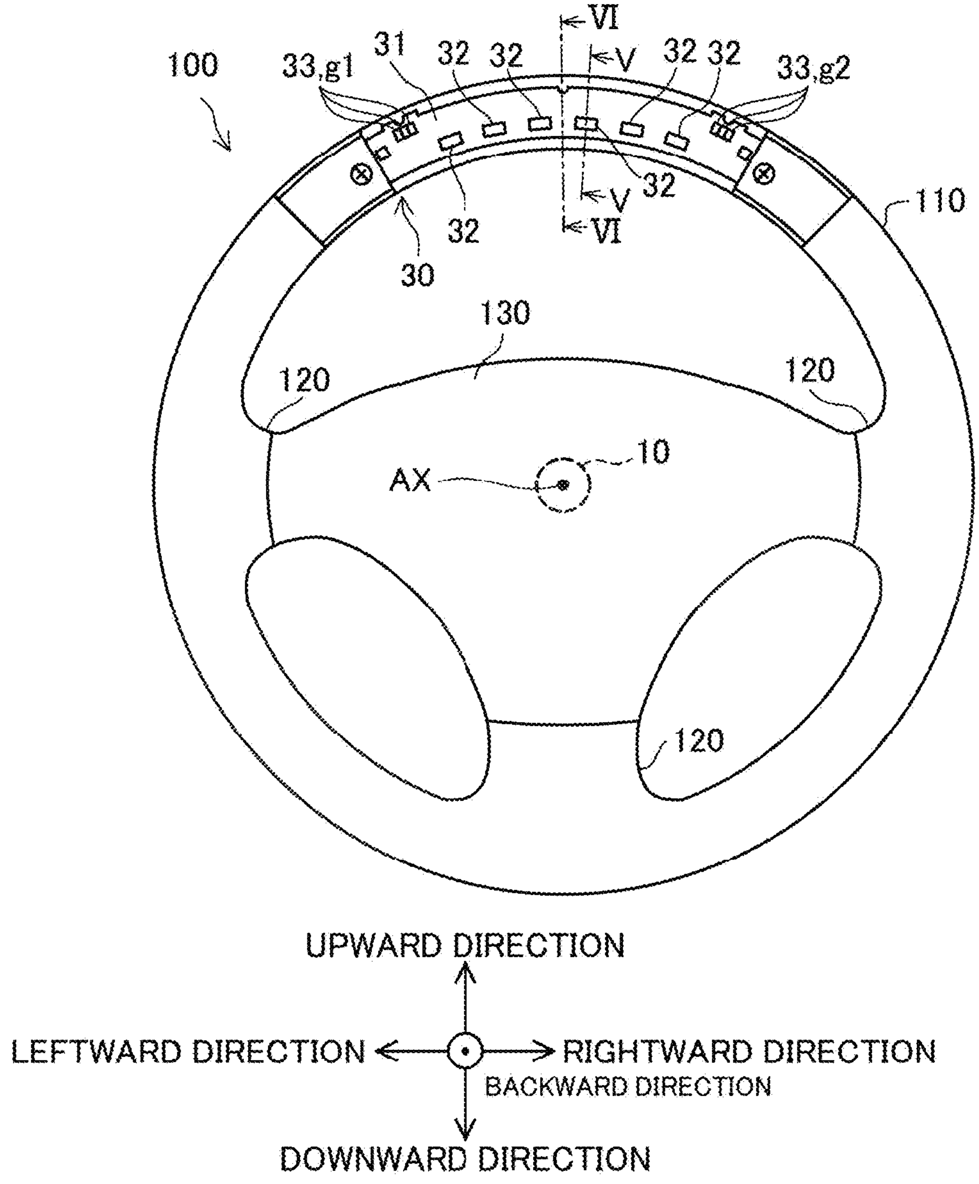
FIG. 2 is a plan view showing the appearance of the steering wheel in a condition where the lens member, the light guide member and the base member are removed.

FIG. 2 is a plan view showing an external form of the steering wheel 100 in a condition where the lens member 10, the light guide member 20 and the base member 40 are removed. As will be described later, in the illumination device 200, at a position facing the driver, the lens member 10 having a light-transmitting property is disposed. Further, in the illumination device 200, on the front side of the lens member 10, the light guide member 20 and the base member 40 to be described later are arranged. FIG. 2 schematically shows the steering wheel 100 without the lens member 10, the light guide member 20 and the base member 40.

As shown in FIG. 2, when the lens member 10, the light guide member 20 and the base member 40 is removed, the light emitting portion 30 which is one of the elements constituting the illumination device 200 is exposed. The light emitting portion 30 includes a substrate 31 and a plurality of light emitting elements provided on the face of the substrate 31. A "plurality of light emitting elements" includes, in this embodiment, a plurality of first LED 32 and a plurality of second LED 33. The substrate 31, as viewed from the driver, has a curved arc and strip-shaped external form along the circumferential direction of the gripping portion 110 (hereinafter, simply referred to as "circumferential direction"). In the following, the radial direction of the gripping portion 110 (direction perpendicular to the axis AX) is simply referred to as a "radial direction". The radial direction of the gripping portion 110 can also be called the radial direction of the steering wheel 100. A plurality of first LED 32 is located on the position close to the end of the lower direction on the rear side of the surface of the substrate 31. The plurality of first LED 32 is spaced apart by a predetermined distance from each other along the circumferential direction. The first LED 32 emits visible light. In the present embodiment, as the first LED 32, visible light LED capable of emitting red light and green light and blue light is used. The plurality of second LED 33 forms two groups g1, g2 that are spaced apart from each other. Each group g1, g2 consists of a plurality of the second LED 33 which are circumferentially adjacent to one another. Both of the two groups g1 and g2 are positioned close to the upward end on the rear surface of the substrate 31. These two groups g1, g2, when viewed along the circumferential, are spaced apart from each other so as to sandwich the plurality of first LED 32. The second LED 33 emits infrared radiation.

Figure 3:
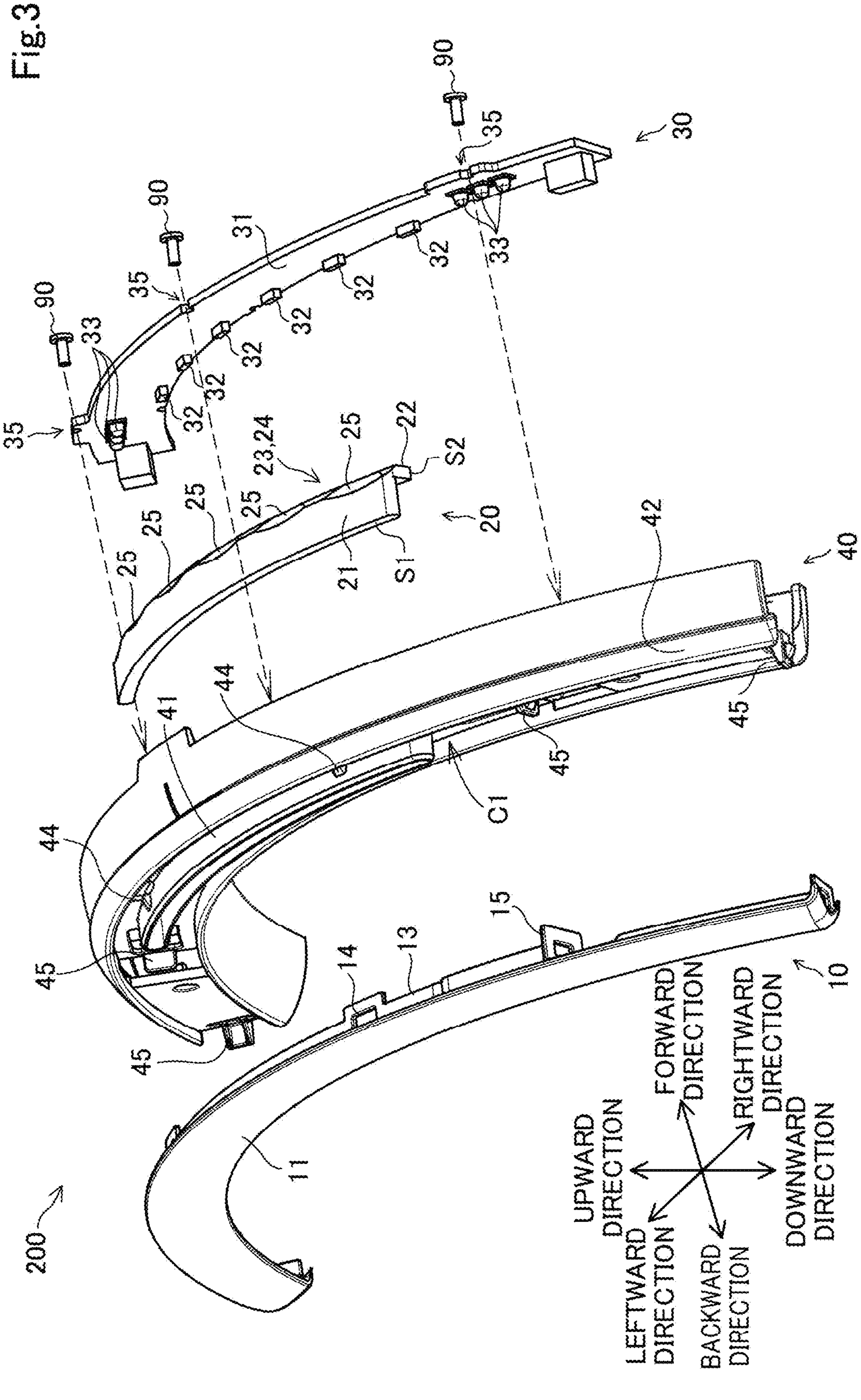
FIG. 3 is a first exploded perspective view showing a detail configuration of the illumination device.
Figure 4:
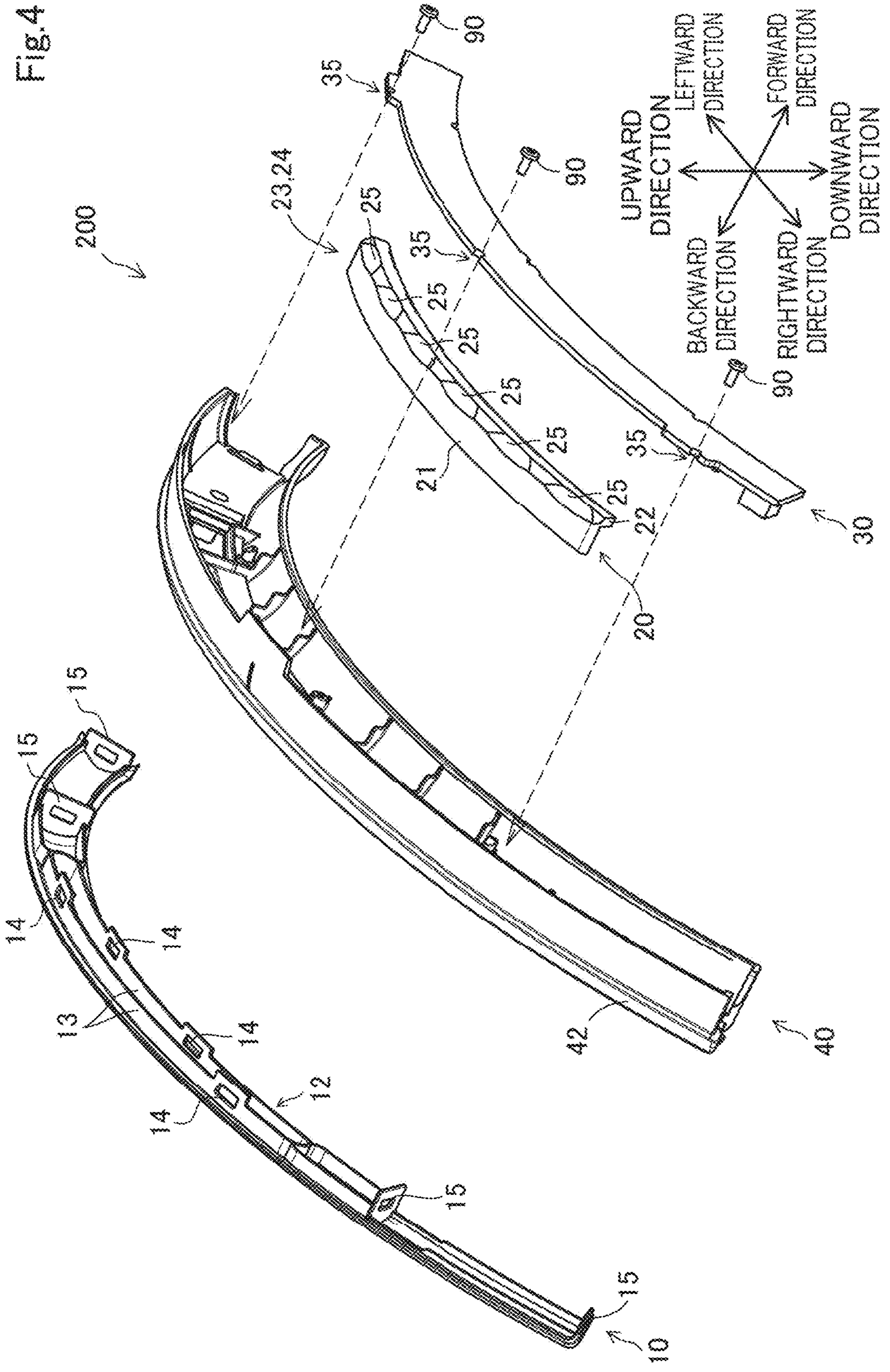
FIG. 4 is a second exploded perspective view showing a detail configuration of the illumination device.
Figure 5:
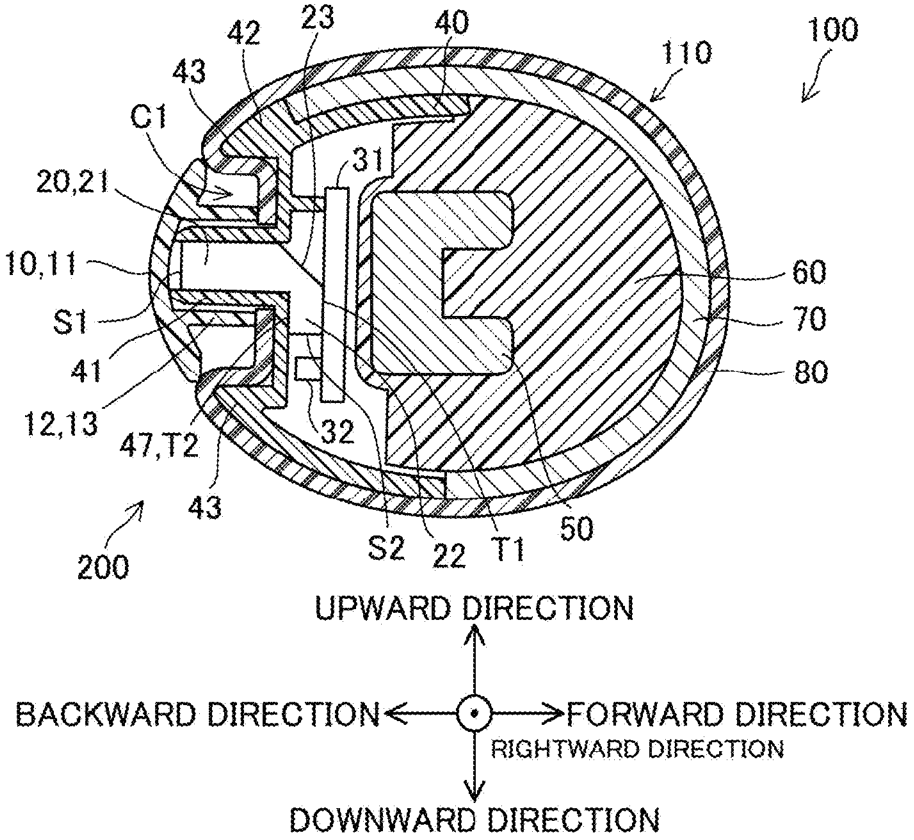
FIG. 5 is a first cross-sectional view showing a cross section of the steering wheel.
Figure 6:
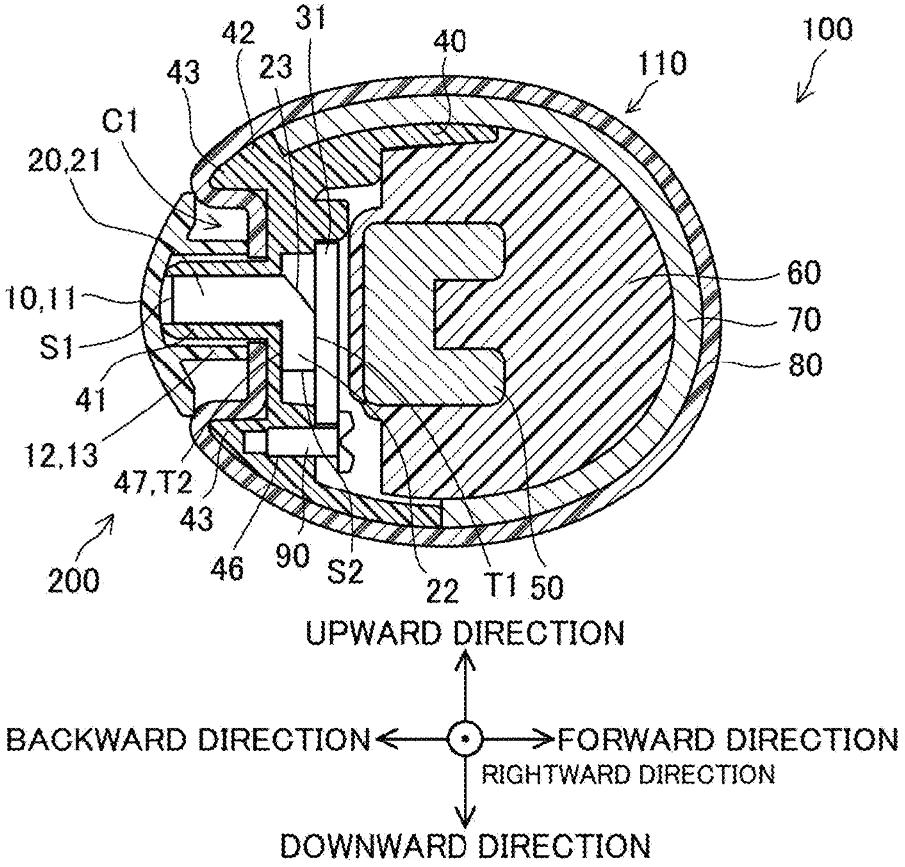
FIG. 6 is a second cross-sectional view showing a cross section of the steering wheel.

A2. Detail Configuration of the Illumination Device 200:

FIG. 3 is a first exploded perspective view showing a detail configuration of the illumination device 200. FIG. 4 is a second exploded perspective view showing a detail configuration of the illumination device 200. FIG. 5 is a first cross-sectional view showing a cross section of the steering wheel 100. FIG. 6 is a second cross-sectional view showing a cross section of the steering wheel 100. FIG. 3 corresponds to an exploded perspective view of the illumination device 200 from approximately the rear side toward the front side. FIG. 4 corresponds to an exploded perspective view of the illumination device 200 from approximately the front side toward the rear side. FIG. 5 shows V-V cross section shown in FIG. 2. FIG. 6 shows VI-VI cross section shown in FIG. 2.

As shown in FIG. 3 and FIG. 4, the illumination device 200 comprises, in addition to the light emitting portion 30 described above, a lens member 10, a light guide member 20, and a base member 40. The illumination device 200 has a structure in which the light guide member 20, the light emitting portion 30, and the lens member 10 are assembled in the front-rear direction and integrated by sandwiching the base member 40.

As shown in FIG. 3 and FIG. 4, the lens member 10 includes a second emission surface 11, a surrounding portion 12, and a plurality of engaging wall 15. The second emission surface 11 shown in FIG. 3 continuously forms the outer surface of the steering wheel 100 with the outer layer 80 as shown in FIG. 5 and FIG. 6. The second emission surface 11, like the substrate 31 described above, as viewed from the driver, has a curved arc and strip-shaped external form along the circumferential direction of the gripping portion 110. The second emission surface 11 has transmissivity of visible light and infrared light. In the present embodiment, the second emission surface 11 has a transmittance of approximately 25% for visible light and a transmittance of approximately 90% for infrared light. The transmittance of visible light and infrared light may be any value higher than 0%, respectively. In this embodiment, the second emission surface 11 is formed of a black transparent synthetic resin in accordance with the black the outer layer 80. The second emission surface 11 may be configured to be covered with the outer layer 80. In such a configuration, since the outer layer 80 has the light transmitting property, the second emission surface 11 can diffuse the visible light emitted from the first LED 32 into the vehicle interior.

In addition to the function of protecting the light emitting portion 30, the second emission surface 11 has a function of limiting the region to transmit visible light emitted from the first LED 32 (in other words, a function of masking the region which does not want to make light) and a function of deflecting the emission direction of the infrared light emitted from the second LED 33 toward the rear side upward serving as the driver side. Furthermore, the second emission surface 11 may have a function of diffusing visible light emitted from the first LED 32. The emitting region 19 shown in FIG. 1 is an area where visible light is transmitted. On the other hand, in FIG. 1, the other areas except the emitting region 19 in the second emission surface 11 is the area where the transmission of visible light is limited.

The surrounding portion 12, as shown in FIG. 4, is provided on the front-side surface (rear surface) of the second emission surface 11. In an assembly state, the surrounding portion 12 surrounds the entire circumference of the transmission suppression portion 41 and the first light passage portion 21 to be described later. The assembly state is a state in which the illumination device 200 has been assembled. The light passage portion 21 corresponds to a part of the light guide member 20 accommodated in the transmission suppression portion 41 in the assembly state. The recess portion C1 has a groove-like construction that opens into the forward-side surface of the base member 40 and extends along the circumferential direction. The transmission suppression portion 41 protrudes rearward from the recess portion C1 of the base member 40 shown in FIG. 3, FIG. 5, and FIG. 6. In the surrounding portion 12, the protrusion 13 corresponding to the side wall along the radial direction protrudes in the depth direction of the recess portion C1 from the inner surface, or the front-side surface of the second emission surface 11.

As apparent from FIG. 3, FIG. 5, and FIG. 6, "the depth direction of the recess portion C1" in this embodiment substantially coincides with the longitudinal direction. As shown in FIG. 4, a plurality of the engaging hole 14 is formed in the protrusion 13. To engage the engaging holes 14, in the assembly state, engaging claws 44 (see FIG. 3) are provided on the outer peripheral surface of the transmission suppression portion 41 of the base member 40. Such engagement is realized as a so-called snap fit. The plurality of the engaging wall 15, as shown in FIG. 4, has a thin wall-like external form protruding forward. The engaging hole is provided in each engaging wall 15. In the assembly state, the engaging wall 15 is placed in contact with the base member 40 the engaging wall 45 (as shown in FIG. 3). In the assembly state, the engaging claw provided in the engaging wall 45 is engaged to the engaging hole of the engaging wall 15. Such engagement is also realized as a so-called snap-fit.

The light guide member 20 guides the light (visible light) emitted from first LED 32 to the lens member 10. In this embodiment, the light guide member 20 is formed of polycarbonate (PC) resin. Note that the light guide member 20 may be formed of an acrylic resin instead of a PC resin. As shown in FIG. 3 or FIG. 6, the light guide member 20 has an external shape cross-sectional shape along the axis AX is substantially L-shaped. Further, the light guide member 20, in accordance with the arrangement positions of the plurality of first LED 32, has an arc-shaped external form as viewed from the driver.

As shown in FIG. 3 or FIG. 6, the light guide member 20 includes a first light passage portion 21, a second light passage portion 22, and a deflection portion 23. The first light passage portion 21 comprises a first emission surface S1 from which visible light exits the light guide member 20 to the lens member 10. The first light passage portion 21 extends along a direction toward the lens member 10 from the surface of the substrate 31 (rear-side surface). This direction is parallel to the direction (hereinafter referred to as "optical axis direction") along the optical axis of the light (hereinafter referred to as "emitted light") emitted from the first emission surface S1. In the present embodiment, the first emission surface S1 is a plane. From the first emission surface S1, the diffused beam with the spread is output as the emitted light. The direction of the center of the diffused beam is parallel to the normal of the first emission surface S1 through the center of the first emission surface S1 when viewed in a radial cross-section. In addition, the center of the diffuse field matches the emitted light's optical axis (optical axis LX, described later). The emitted light emitted from the first emission surface S1 is received by the lens member 10 and emitted from the second emission surface 11 to the outside. Therefore, the second emission surface 11 described above can be said to be a surface from which the received emitted light is emitted to the outside of the lens member 10 or vehicle interior.

The second light passage portion 22 has an incidence surface S2 visible light output from the first LED 32 is incident. As shown in FIG. 5, the incidence surface S2 is located upward with respect to the first LED 32. Therefore, visible light is incident to the incidence surface S2 upward from the first LED 32. The deflection portion 23 connects the first light passage portion 21 to the second light passage portion 22. The deflection portion 23 reflects the visible light guided by the second light passage portion 22 and enters the first light passage portion 21. More specifically, the deflection portion 23 deflects visible light entering the second light passage portion 22 from the incidence surface S2 and travelling upward so that it travels front, thereby inputting it into the first light passage portion 21. As shown in FIG. 4, the deflection portion 23 has a deflection surface 24 which deflects visible light. At the deflection surface 24, a plurality of the diffusion portion 25 are formed. Each diffusion portion 25 is disposed at a corresponding position in front with respect to each first LED 32. The diffusion portion 25 has a recess-like structure in which the deflection surface 24 is partially chamfered. Specifically, each diffusion portion 25 has a concave structure such that the position corresponding to the forward direction relative to the first LED 32 is most deeply recessed, and the depth gradually decreases as one moves along the circumferential direction toward the position corresponding to the adjacent first LED 32. Further, the width of each diffusion portion 25, i.e. the vertical dimension, with respect to the first LED 32 upward direction (more precisely, the direction toward the radially outer) corresponding position is the largest, gradually decreases toward the position corresponding to the first LED 32 next along the circumferential direction. By the deflection portion 23 having such a structure, visible light emitted from point light source is to be diffused in the circumferential direction and the vertical direction when deflected in the deflection portion 23. As shown in FIG. 5 and FIG. 6, in the assembly state, the first light passage portion 21 is housed in the recess portion C1. On the other hand, in the assembly state, the second light passage portion 22 and the deflection portion 23 are located on the forward side of the base member 40 and are not housed in the recess portion C1.

The base member 40 holds the light guide member 20 and the light emitting portion 30 mounted on its front side and the lens member 10 mounted on its rear side. As shown in FIG. 3 and FIG. 4, the base member 40 has an arc-shaped and strip-shaped external form curved along the circumferential direction, as viewed by the driver. In this embodiment, the base member 40 is configured as a single piece (single component) formed of ABS resin. Instead of ABS resin or in addition to ABS resin, the base member 40 may be configured as a single part (single component) formed of a PC resin. Further, the base member 40 may be configured as a composite component combining a plurality of parts. In the present embodiment, the base member 40 is configured to suppress the transmission of visible light. Specifically, the base member 40 is composed of a colored ABS which does not transmit visible light.

As described above, on the surface of the base member 40 in the rear direction, the recess portion C1 is formed continuously in the circumferential direction. As shown in FIG. 3 or FIG. 6, in the front side surface of the base member 40, in the upper direction side and in the lower direction side across the recess portion C1, a covered portion 42 is provided continuously in the circumferential direction. As shown in FIG. 5 and FIG. 6, the cross-sectional form of the outer surface of the covered portion 42 has a shape in which the angle between the plane present in the upward direction and the plane present in the downward direction across the top 43 is acute. The covered portion 42 is covered by the outer layer 80 described later.

In the recess portion C1, through holes penetrating through the thickness are formed at the part corresponding to the light guide member 20. As shown in FIG. 5 and FIG. 6, the first light passage portion 21 of the light guide member 20 is inserted in these through holes. As shown in FIG. 3, FIG. 5 and FIG. 6, the transmission suppression portion 41 described above is provided in the recess portion C1 such that the transmission suppression portion 41 surrounds the through holes in which the first light passage portion 21 is inserted. The transmission suppression portion 41, similar to the surrounding portion 12 of the lens member 10 shown in FIG. 4, has a through hole and is formed to protrude forward such that it covers the side surface of the first light passage portion 21 inserted into the through hole while contacting it around its entire circumference. As shown in FIG. 3, the transmission suppression portion 41 has a flat cylindrical external form curved in an arc shape. As described above, a plurality of the engaging claw 44 is provided on the outer peripheral surface of the transmission suppression portion 41. The engaging claw 44 is engaged with the engaging hole 14 of the lens member 10 in the assembly state. The transmission suppression portion 41, like other sites in the base member 40, to suppress the transmission of visible light. In this embodiment, the entire of the base member 40 is formed of a material having a predetermined color and having no visible light transmittance. It is to be noted that the entire the base member 40 may be formed of a light-transmitting material, and only a portion corresponding to the transmission suppression portion 41 may have a configuration in which a black film is attached to the portion, or a configuration in which the portion is painted in a predetermined color. The transmission suppression portion 41, in addition to suppressing the transmission of visible light, suppresses the positional deviation in the vertical direction and the lateral direction of the light guide member 20 including the first light passage portion 21.

A3. Detail Configuration of the Gripping Portion 110:

The cross-sectional configuration of the other portions of the gripping section 110, excluding the portion where the illumination device 200 is mounted, differs from the cross-sectional configuration of the portion where the illumination device 200 is mounted shown in FIG. 5 and FIG. 6 in that the illumination device 200 is not mounted thereon; the other configurations are the same.

As shown in FIG. 5 and FIG. 6, the gripping portion 110 includes a core metal 50, a core portion 60, an element layer 70, the illumination device 200 described above, and an outer layer 80.

The core metal 50 is a metallic and structural member of the gripping portion 110. In the present embodiment, the core metal 50 is made of aluminum-alloy. Incidentally, instead of an aluminum alloy, the core metal 50 may be formed by any type of metal such as magnesium alloy or steel. The core portion 60 is positioned to cover the entire the core metal 50 and forms the core of the gripping portion 110. The core portion 60 is formed of a soft synthetic resin having a cushioning property. Specifically, in this embodiment, the core portion 60 is formed of a soft foam material such as foamed polyurethane. The element layer 70 partially covers the core portion 60. The element layer 70 has a heating wire that constitutes a heater device and a layer that is provided with electrodes for detecting gripping. The element layer 70 is formed, for example, of a conductive cloth in which a surface treatment such as carbon coating or metallic plating is applied to a textile cloth. As shown in FIG. 5 and FIG. 6, in the gripping portion 110 where the illumination device 200 is installed, the element layer 70 also covers part of the base member. The outer surface of the element layer 70 and a portion of the outer surface of the base member 40 form a curved surface that is contiguous. The outer layer 80 continuously covers the outer surface of the element layer 70, the outer surface of the covered portion 42 of the base member 40, and the inside of the recess portion C1 of the base member 40. As shown in FIG. 5 and FIG. 6, the terminal part of the leather member that composes the outer layer 80 is housed in the recess portion C1. The outer layer 80 is made of a leather member. In the present embodiment, the leather member is composed of natural leather such as a top leather or a split leather divided from the top leather. Note that the leather member may be made of any type of leather material, such as synthetic leather or artificial leather, instead of natural leather.

A4. Method for Manufacturing the Steering Wheel 100:

Method for manufacturing the steering wheel 100 having the configuration described above will be described. First, producing a member excluding the lens member 10 from the illumination device 200 (hereinafter referred to as "illumination sub-assy"). Specifically, first, the lens member 10, the light guide member 20, the light emitting portion 30, and the base member 40 are manufactured. Then, the light guide member 20 and the light emitting portion 30 are attached to the rear surface of the base member 40 (the front side surface in the assembly state). At this time, three screw 90 shown in FIG. 3 and FIG. 4, while being accommodated in the notch 35 provided on the upper edge of the substrate 31 is screwed to the screw hole 46 (see FIG. 6). In this way, the illumination sub-assy is completed. Next, the core metal 50 is formed. The core portion 60 and the element layer 70 are formed so as to surround the core metal 50. Hereinafter, the member obtained in this way is referred to as a "handle material". Formation of the handle material may be realized, for example, by two-color molding. Subsequently, the illumination sub-assy is fastened to the core metal 50 using screws. Thus, the handle material and the illumination sub-assy are integrated. Note that in FIG. 5 and FIG. 6, it shows a cross section in the portion without screws for fastening. Thus, by the illumination sub-assy and the core metal 50 are fastened to each other by screws, it is possible to transmit the heat generated with the light emission of the light emitting portion 30 to the core metal 50. Therefore, the illumination device 200 can be suppressed from being excessively raised temperature. Subsequently, the outer layer 80 is formed by winding the leather member on the outer surface of a member in which the handle material and the illumination sub-assy are integrated. The outer layer 80 may be formed, for example, by winding a plurality of leather member parts in the circumferential direction, respectively. Subsequently, a wall of the recess portion C1 is coated with adhesive, and ends of outer layer 80 are bent along the covered portion 42 to be accommodated in the recess portion C1 and adhered to the recess portion C1 wall. The lens member 10 is then snapped onto the recess portion C1 and the lens member 10 is attached to the base member 40. In addition to the above-described procedures, there are procedures for accommodating an air bag or an inflator (not shown) in the boss portion 130, but these procedures will not be described.

According to the manufacturing process described above, the lens member 10 is fitted into the recess portion C1 covered with the outer layer 80. Therefore, the outer peripheral edge of the lens member 10, in other words, the outer peripheral edge of the second emission surface 11 and the outer layer 80 are in contact with each other. However, due to assembly errors and aging, the contact is released, and a slight gap may occur between the outer peripheral edge of the lens member 10 and the outer layer 80. However, according to the present disclosure, it is possible to suppress the leakage of the light emitted from the first emission surface S1 to the outside from such a gap. It will be described below with reference to FIG. 7 specific configuration for achieving such effectiveness.

Figure 7:
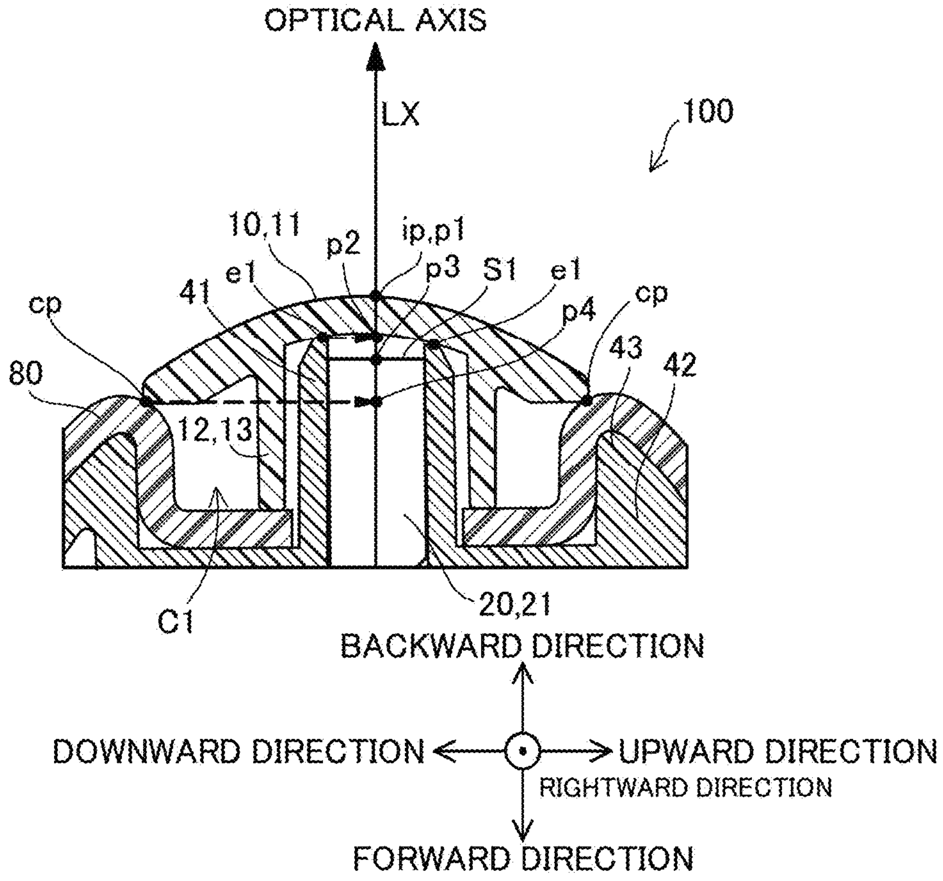
FIG. 7 is a partially enlarged cross-sectional view showing a cross section of the steering wheel.

A5. Suppression of Light Leakage:

FIG. 7 is a partially enlarged cross-sectional view showing a cross section of the steering wheel 100. In FIG. 7, the area near the first emission surface S1 of the steering wheel 100 is extracted and enlarged. Similar to FIG. 5 and FIG. 6, FIG. 7 corresponds to the radial cross section.

As shown in FIG. 7, the direction along the optical axis LX of the emitted light emitted from the first emission surface S1 (hereinafter referred to as "optical axis direction") is approximately parallel to the forward and backward directions. Four types of points p1, p2, p3, p4 are specified in FIG. 7. The point p1 corresponds to the intersection point ip between the second emission surface 11 in the lens member 10 and the optical axis LX. The point p2 is the end point in the optical axis direction of the transmission suppression portion 41, corresponding to the position in the optical axis direction of the end point e1 on the lens member 10 side. The point p3 corresponds to the position of the first emission surface S1 in the optical axis direction. The point p4 corresponds to the position along the optical axis direction at the contact point cp between the peripheral portion of lens member 10 and outer layer 80.

In the radial cross-section of the steering wheel 100, the point p3 position is farther from the point p1 (the intersection point ip) position than the point p2 position. In other words, the position along the optical axis of the first emission surface S1 is farther from the intersection point ip between the second emission surface 11 and the optical axis LX than the position along the optical axis of the end e1 of the transmission suppression portion 41. In other words, the position of the first emission surface S1 along the light axis direction is set further forward than the position of the end e1 of the transmission suppression portion 41 along the light axis direction. With this configuration, of the emitted light emitted from the first emission surface S1, the light to be directed in a direction other than the rear direction is blocked by the transmission suppression portion 41. Therefore, it is possible to suppress the leakage of the emitted light from the contact position cp.

Since the point p3 is closer than the point p4 to the intersection point ip, the first emission surface S1 and the lens member 10 can be more closer with each other than in a configuration in which the point p3 is farther than the point p4 to the intersection point ip. Therefore, it is possible to further increase the brightness of the light emitted from the second emission surface 11 to the outside.

According to the steering wheel 100 of the first embodiment described above, in the radial cross-section of the steering wheel 100, the position of the first emission surface S1 in the optical axis direction is farther from the intersection point of the second emission surface 11 and the optical axis LX than the position of the end e1 of the transmission suppression portion 41 in the optical axis direction, which is the end e1 on the lens member 10 side. Therefore, among the lights emitted from the first emission surface S1, the light that diverges from the optical axis direction can be blocked by the transmission suppression portion 41. Therefore, it is possible to suppress the leakage of light emitted from the light guide member 20.

Since the transmission suppression portion 41 is configured as a part of the base member 40, the transmission suppression portion 41, as compared with the configuration in which the transmission suppression portion is constituted by a dedicated member, it is possible to reduce the weight and cost by reducing the number of components.

Since the transmission suppression portion 41 surrounds the side surface of the first light passage portion 21 over the entire circumference, and is in contact with the side surface of the first light passage portion 21, it is possible to suppress the light leakage from the first light passage portion 21, and to use the transmission suppression portion 41 as a positioning of the first light passage portion 21. Therefore, it can be easily assembled, also it is possible to suppress the occurrence of positional deviation due to aging deterioration.

B. Second Embodiment

Figure 8:
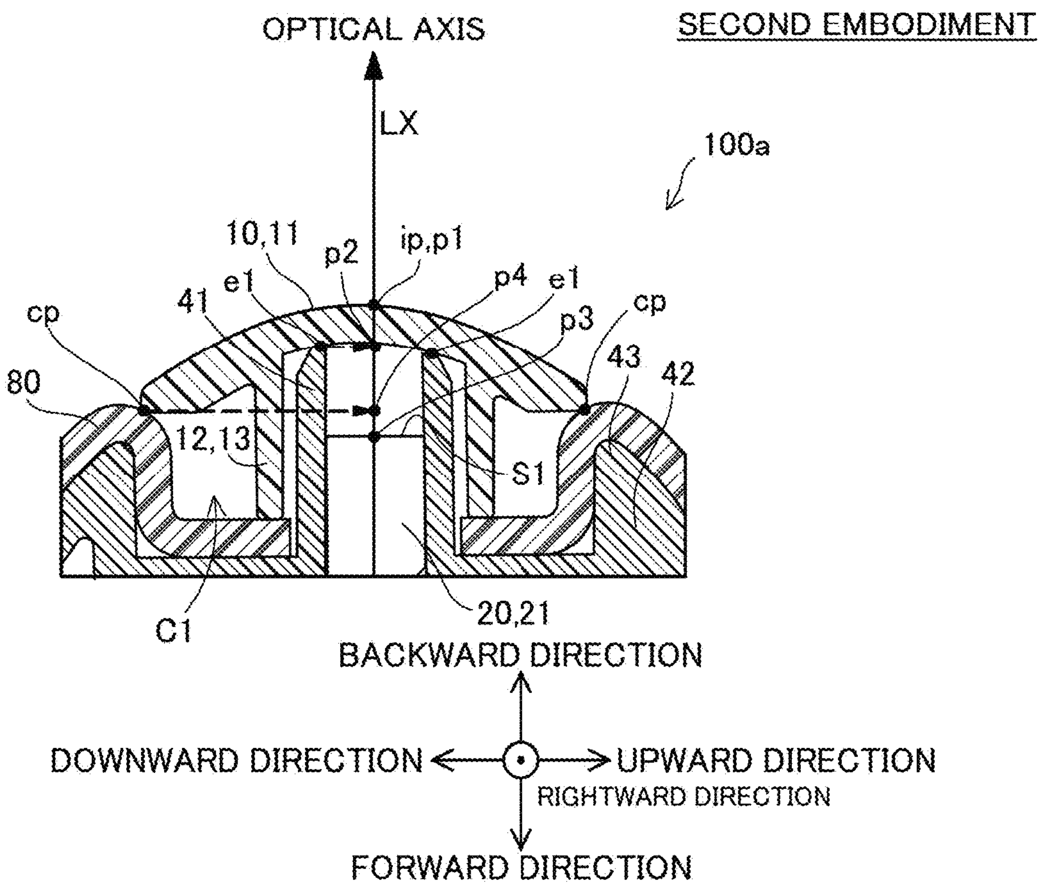
FIG. 8 is a partially enlarged sectional view showing a cross section of the steering wheel of the second embodiment.

FIG. 8 is a partially enlarged sectional view showing a cross section of the steering wheel 100*a* of the second embodiment. FIG. 8 shows a cross section of the same scope as FIG. 7. The steering wheel 100*a* of the second embodiment differs from the steering wheel 100 of the first embodiment shown in FIGS. 1 to 7 in that the optical axis length of the first light passage portion 21 is shorter, and in that the position in the optical axis direction of the point p3 is located forward of the point p4 corresponding to the position in the optical axis direction of the contact position cp. Since another configuration in the steering wheel 100*a* of the second embodiment is the same as the steering wheel 100 of the first embodiment, the same reference numerals are given to the same element, and a detail description thereof will be omitted.

Also in the second embodiment shown in FIG. 8, the position (point p3) of the first emission surface S1 in the optical axis direction within the radial cross-section of the steering wheel 100*a* is located farther along the optical axis direction from the position of the intersection point i1 (point p1) at the intersection of the second emission surface 11 and the optical axis LX than the position of the end e1 (point p2) on the lens member 10 side of the transmission suppression portion 41 in the optical axis direction. Therefore, among the lights emitted from the first emission surface S1, the light that travels in a direction different from the optical axis direction can be blocked by the transmission suppression portion 41. Therefore, it is possible to suppress the leakage of light emitted from the light guide member 20.

The steering wheel 100*a* of the second embodiment described above has the same advantages as the steering wheel 100 of the first embodiment.

C. Third Embodiment

Figure 9:
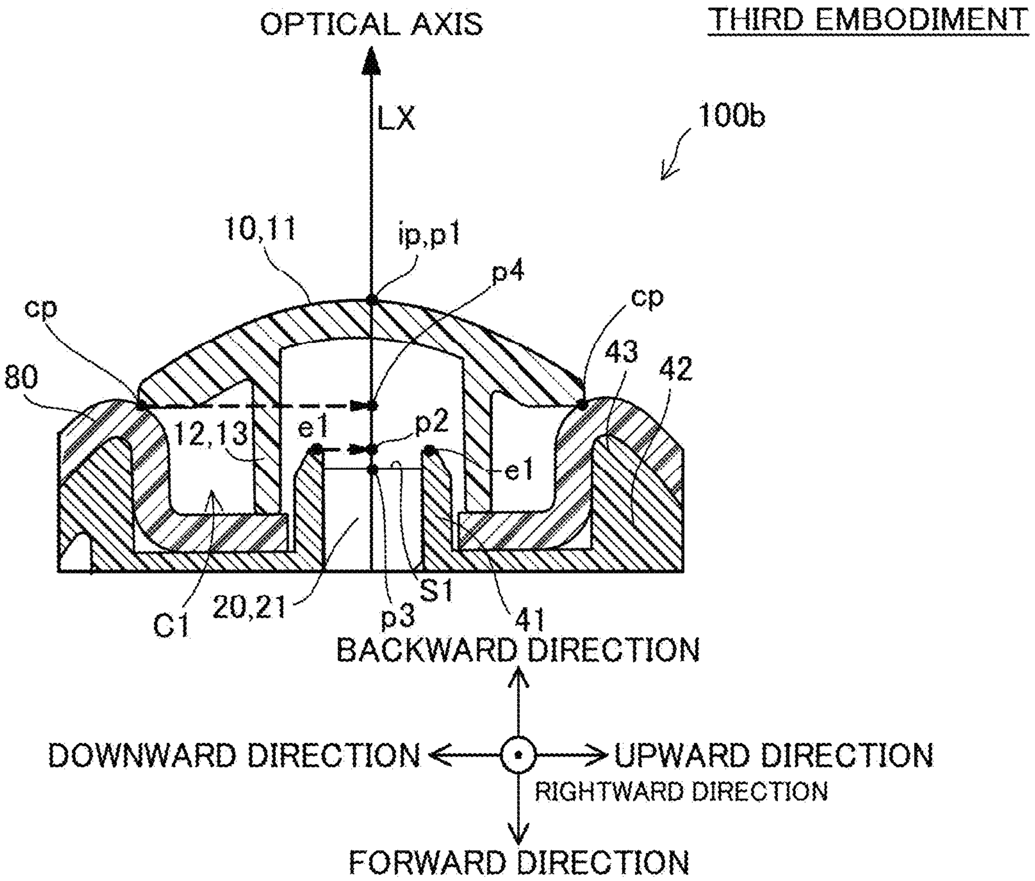
FIG. 9 is a partially enlarged sectional view showing a cross section of the steering wheel of the third embodiment.

FIG. 9 is a partially enlarged sectional view showing a cross section of the steering wheel 100*b* of the third embodiment. FIG. 9 shows a cross section of the same scope as FIG. 7. The steering wheel 100*b* of the third embodiment differs from the steering wheel 100 of the first embodiment shown in FIGS. 1 to 7 in that the optical axis length of the first optical passage portion 21 is shorter and the optical axis length of the transmission suppression portion 41 is shorter. Since another configuration in the steering wheel 100*b* of the third embodiment is the same as the steering wheel 100 of the first embodiment, the same reference numerals are given to the same element, and a detail description thereof will be omitted.

In the third embodiment, in addition to the point p3, the point p2 is also positioned forward than the point p4 corresponding to the optical axis direction position of the contact position cp. However, in the third embodiment shown in FIG. 9, the position (point p3) of the first emission surface S1 in the optical axis direction within the radial cross-section of the steering wheel 100*b* is located farther along the optical axis direction from the position of the intersection point ip (point p1) at the intersection of the second emission surface 11 and the optical axis LX than the position of the end e1 (point p2) on the lens member 10 side of the transmission suppression portion 41 in the optical axis direction. Therefore, among the lights emitted from the first emission surface S1, the light that travels in a direction different from the optical axis direction can be blocked by the transmission suppression portion 41. Therefore, it is possible to suppress the leakage of light emitted from the light guide member 20.

The steering wheel 100*b* of the third embodiment described above has the same advantages as the steering wheel 100 of the first embodiment.

D. Fourth Embodiment

Figure 10:
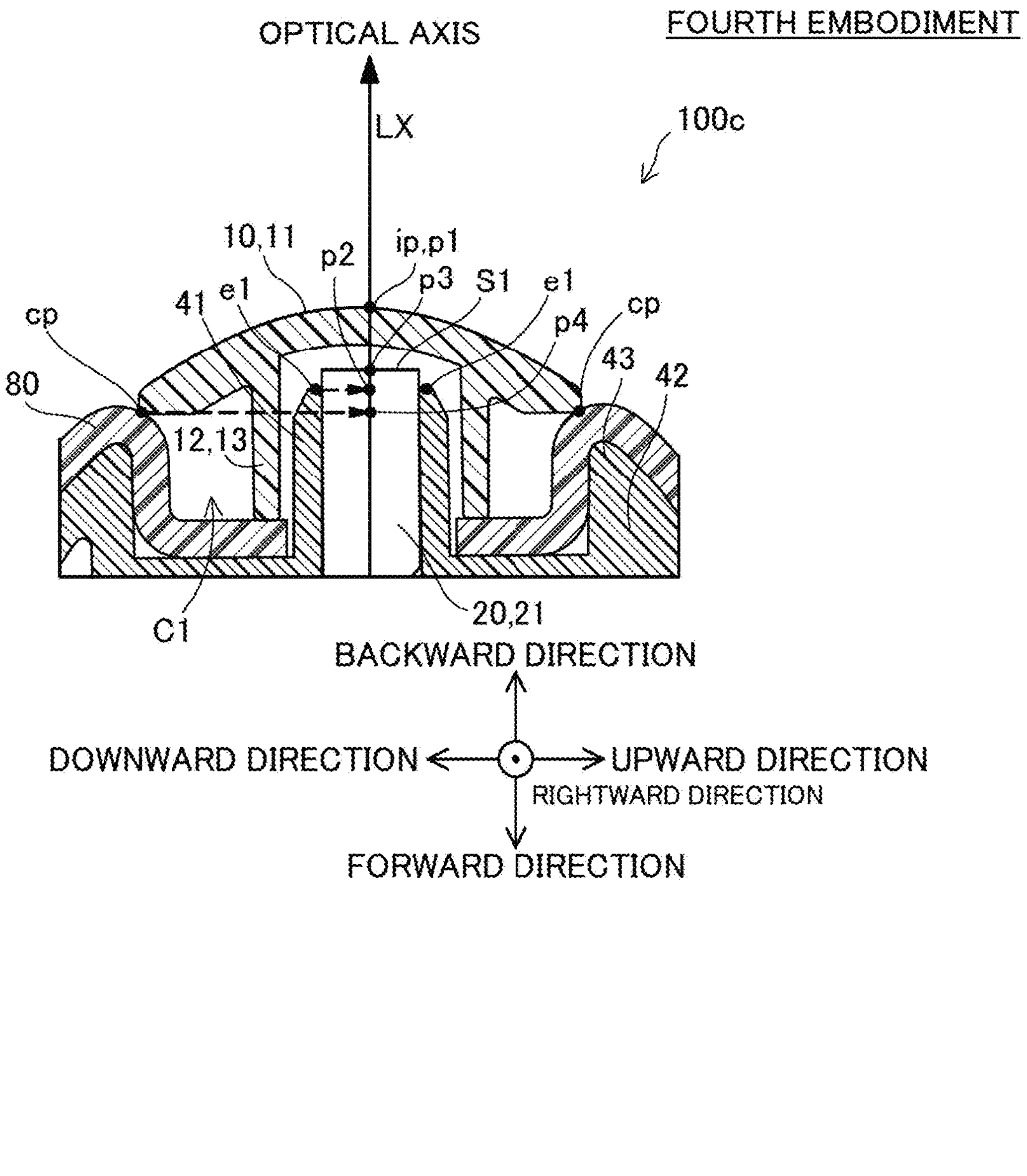
FIG. 10 is a partially enlarged sectional view showing a cross section of the steering wheel of the fourth embodiment.

FIG. 10 is a partially enlarged sectional view showing a cross section of the steering wheel 100*c* of the fourth embodiment. FIG. 10 shows a cross section of the same scope as FIG. 7. The steering wheel 100*c* of the third embodiment differs from the steering wheel 100 of the first embodiment shown in FIGS. 1 to 7 in that the length of the light axis direction of the transmission suppression portion 41 is shorter. Since another configuration in the steering wheel 100*c* of the fourth embodiment is the same as the steering wheel 100 of the first embodiment, the same reference numerals are given to the same element, and a detail description thereof will be omitted.

In the fourth embodiment, in the radial cross-section of the steering wheel 100*c*, the position of the first emission surface S1 along the optical axis direction (point p3) is closer to the intersection point ip of the second emission surface 11 and the optical axis LX than either the optical axis position (point p2) of the end e1 of the transmission suppression portion 41 or the optical axis position (point p4) of the contact position cp. In other words, the position of the first emission surface S1 in the optical axis direction is located rearward relative to both the position of the end e1 of the transmission suppression portion 41 in the optical axis direction and the position of the contact position cp in the optical axis direction. Therefore, it is possible to suppress the emitted light emitted from the first emission surface S1 is directed to the contact position cp, and to suppress the leakage of lights emitted from the light guide member 20. In the fourth embodiment, the position (point p2) of the end e1 of the transmission suppression section 41 in the optical axis direction is closer to the intersection point ip than the position (point p4) of the contact position cp in the optical axis direction.

According to the steering wheel 100*c* of the fourth embodiment described above, in the radial cross-section of the steering wheel 100*c*, the position of the first emission surface S1 in the optical axis direction along the optical axis LX of the emitted light is closer to the intersection point ip between the second emission surface 11 and the optical axis LX than either of the following positions: the position along the optical axis of the end e1 in the optical axis direction at the end e1 on the lens member 10 side within the light transmission suppression section 41 and the contact position cp between the peripheral portion and the outer skin layer 80 in the optical axis direction. Therefore, it is possible to suppress the emitted light emitted from the first emission surface S1 from being directed toward the contact position cp. Therefore, it is possible to suppress the leakage of light emitted from the light guide member 20.

E. Fifth Embodiment

Figure 11:
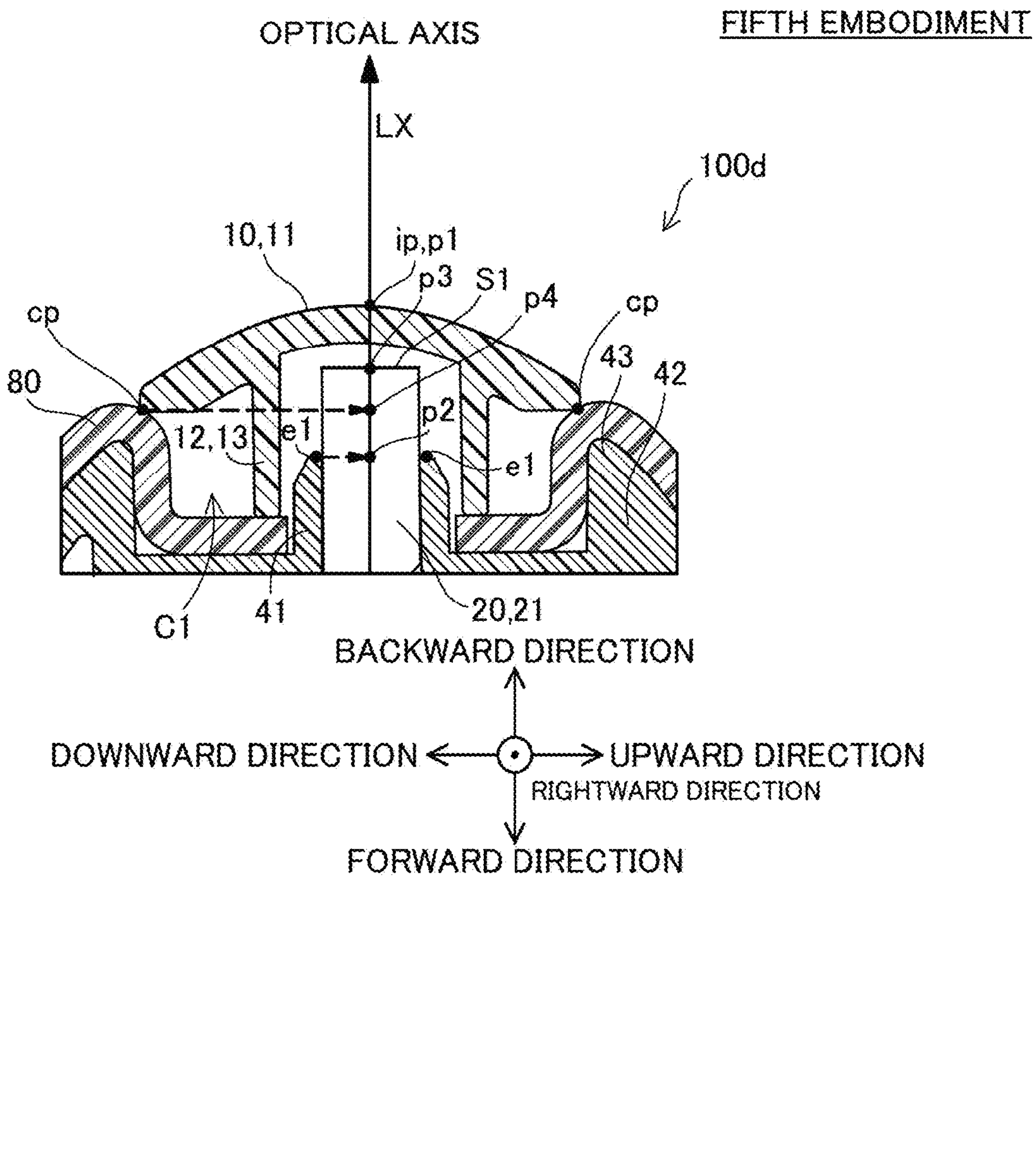
FIG. 11 is a partially enlarged sectional view showing a cross section of the steering wheel of the fifth embodiment.

FIG. 11 is a partially enlarged sectional view showing a cross section of the steering wheel 100*d* of the fifth embodiment. FIG. 11 shows a cross section of the same scope as FIG. 10. The steering wheel 100*d* of the fifth embodiment differs from the steering wheel 100*c* of the fourth embodiment shown in FIG. 10 in that the length of the transmission suppression portion 41 in the optical direction is shorter. Since another configuration in the steering wheel 100*d* of the fourth embodiment is the same as the steering wheel 100*c* of the third embodiment, the same reference numerals are given to the same element, and a detail description thereof will be omitted.

In the fifth embodiment, in the radial cross-section of the steering wheel 100*d*, the position of the end e1 (point p2) on the lens member 10 side of the transmission suppression portion 41 in the optical axis direction is farther from the intersection point ip of the second injection surface 11 and the optical axis LX than the position in the optical direction of the contact position cp. In other words, the position (point p2) of the end e1 in the optical axis direction within the light transmission suppression portion 41 is located toward the front relative to the position (point p3) of the first emission surface S1 in the optical axis direction and the position (point p4) of the contact point cp in the optical axis direction. Even in this configuration, the position of the first emission surface S1 in the optical axis direction is located further rearward than either the position of the end e1 of the transmission suppression portion 41 in the optical axis direction or the position of the contact point cp in the optical axis direction. Therefore, the steering wheel 100*d* of the fifth embodiment achieves the same advantages as the steering wheel 100*c* of the fourth embodiment.

F. Other Embodiments (F1) In each embodiment, the transmission suppression portion 41 is configured as a part of the base member 40, but the present disclosure is not limited thereto. For example, the transmission suppression portion 41 may be constituted by other members independent of the base member 40.

(F2) In the respective embodiments, the contact position cp was the contact position between the periphery of the lens member 10 (the second emission surface 11) and the outer layer 80, but the present disclosure is not limited thereto. In a configuration where the outer layer 80 is omitted, the contact position cp may be the contact position between the peripheral portion of the lens member 10 and another part on the base member 40 that is different from the transmission suppression portion 41 (e.g., the top portion 43). In this configuration, the "another part different from the transmission suppression portion 41 on the base member 40" corresponds to a "other member" distinct from the light source (first LED 32), the light guide member 20, and the transmission suppression portion 41.

(F3) In the respective embodiments, the transmission suppression portion 41 surrounds the side surface of the first light passage portion 21 over the entire circumference and contacts the side surface of the first light passage portion 21. However, the present disclosure is not limited thereto. The transmission suppression portion 41 may be configured to surround only a portion of the side surface of the first light passage portion 21. Further, the transmission suppression portion 41 may be disposed slightly away from the side surface of the first light passage portion 21.

(F4) In the respective embodiments, the substrate 31 is attached to the base member 40, the core metal 50, and the lens member 10 by a the screw stop, but the present disclosure is not so limited. For example, the base member 40 may be configured to include engagement claws, whereby the substrate 31 is mounted by engaging with the substrate 31 via these engagement claws. Further, the substrate 31 may be attached by, for example, adhesion by an adhesive or the like, or by welding or the like.

(F5) In the respective embodiments, the illumination device 200 was provided on the gripping portion 110, but the present disclosure is not so limited. For example, the illumination device 200 may be provided on any portion of the steering wheel 100, 100*a* to 100*d*, such as the boss portion 130 or the spoke portion 120. In this instance, the shape and configuration of the illumination device 200 can be appropriately changed according to the size, shape, or the like of the location where the illumination device 200 is provided. It is desirable that the position of the illumination device 200 be directly visible from the driver. However, if, for example, the light emitted from the illumination device 200 is reflected by a surface of any site within vehicles, for example, the surface of the instrument panel, and such reflected light is visible to the driver, then the position of the illumination device 200 may be a position that is directly invisible to the driver.

(F6) The configuration of the steering wheel 100 and 100*a*~100*d* of the embodiments is only an example. The configuration can be variously changed. For example, in the respective embodiments, the protrusion 13 may be omitted. Further, in the respective embodiments, a plurality of second LED 33 may be omitted. Further, in the respective embodiments, the light guide member 20 has a cross-sectional shape along the axis AX was substantially L-shaped. That is, the first direction and the second direction were orthogonal to each other. However, the first light passage portion 21 and the second light passage portion 22 may be arranged so that these orientations intersect at any angel other than 90°.

The present disclosure is not limited to each of the embodiments described above and is able to be realized with various configurations without departing from the spirit thereof. For example, technical features in the embodiments corresponding to the technical features in the aspects described in the section of SUMMARY are able to be replaced with each other or combined together, as appropriate, in order to solve part or the whole of the problems described previously or to achieve part or the whole of the effects described previously. When the technical features are not described as essential features in the present specification, they are able to be deleted, as appropriate. For example, the present disclosure may be realized in aspects described below.

(1) According to one aspect of the present disclosure, a steering wheel is provided. The steering wheel may comprise a light source, a light guide member having a light passage portion that includes a first emission surface formed at an end of the light passage portion, guiding light output from the light source by the light passage portion, and emitting the light from the first emission surface, a transmission suppression portion suppressing a transmission of the light and covering a side surface of the light passage portion, and a lens member having transmissivity for emitted light emitted from the first emission surface, receiving the emitted light and having a second emission surface for emitting the emitted light outward. In a radial cross-section of the steering wheel, a position of the first emission surface in an optical axis direction along an optical axis of the emitted light may be farther from an intersection point of the second emission surface and the optical axis than a position in the optical axis direction of an end on a lens member side of the transmission suppression portion.

According to the steering wheel of this aspect, in the radial cross-section of the steering wheel, the position of the first emission surface in the optical axis direction is farther from the intersection point of the second emission surface and the optical axis than the position in the optical axis direction of the end on a lens member side of the transmission suppression portion. Therefore, among the lights emitted from the first emission surface, the light that diverges from the optical axis direction can be blocked by the transmission suppression portion. Therefore, the leakage of the light emitted from the light guide member can be suppressed.

(2) According to another aspect of the present disclosure, a steering wheel is provided. The steering wheel may comprise a light source, a light guide member having a light passage portion that includes a first emission surface formed at an end of the light passage portion, guiding light output from the light source by the light passage portion, and emitting the light from the first emission surface, a transmission suppression portion suppressing a transmission of the light and covering a portion of a side surface of the light passage portion, a lens member having transmissivity for emitted light emitted from the first emission surface, receiving the emitted light and having a second emission surface for emitting the emitted light outward, and an other member distinct from the light source, the light guide member and the transmission suppression portion, being contact with a peripheral portion of the lens member. In a radial cross-section of the steering wheel, a position of the first emission surface in an optical axis direction along the optical axis of the emitted light may be closer to an intersection point of the second emission surface and the optical axis than either a position in the optical axis direction of an end on a lens member side of the transmission suppression portion or a position of contact between the peripheral portion and the other member in the optical axis direction.

According to the steering wheel of this aspect, in the radial cross-section of the steering wheel, the position of the first emission surface in the optical axis direction along the optical axis of the emitted light is closer to the intersection point between the second emission surface and the optical axis than either a position in the optical axis direction of an end on a lens member side of the transmission suppression portion or a position of contact between the peripheral portion and the other member in the optical axis direction. Therefore, it is possible to suppress the emitted light emitted from the first emission surface from being directed toward the contact position. Therefore, the leakage of the light emitted from the light guide member can be suppressed.

(3) In the steering wheel of the above aspect, the other member may be a leather member forming at least a portion of an outer surface of the steering wheel.

According to the steering wheel of this aspect, since the other member is a leather member, which forms at least a part of the outer surface of the steering wheel, it is possible to suppress light leaking from the contact position between the lens member peripheral portion and the leather member.

(4) The steering wheel of the above aspect may further comprise a base member to which the lens member and a substrate having the light source are mounted, the base member holding the substrate and the lens member. The transmission suppression portion may be configured as a part of the base member.

According to the steering wheel of this aspect, since the transmission suppression portion is configured as a part of the base member, it is possible to reduce the weight and cost of the transmission suppression portion by reducing the number of components as compared with the configuration in which the transmission suppression portion is configured by a dedicated member.

(5) In the steering wheel of the above aspect, the transmission suppression portion may surround the side surface of the light passage portion over entire circumference of the light passage portion and may be in contact with the side surface of the light passage portion.

According to the steering wheel of this aspect, the light transmission suppression portion surrounds the side surface of the light passage portion over entire circumference of the light passage portion and is in contact with the side surface of the light passage portion. Therefore, it is possible to suppress light leaking from the light passage portion and to use the transmission suppression portion as a positioning of the light passage portion. Therefore, assembly is simplified, and positional shifts due to aging degradation are suppressed.

What is claimed is:

1. A steering wheel comprising:

a light source;

a light guide member having a light passage portion and an emission end surface emitting light from the light source;

a transmission suppression portion covering a side surface of the light passage portion; and a lens member receiving light from the light guide member and emitting the received light from a second emission surface, wherein a point on an optical axis of light emitted from the emission end surface and on the emission end surface is farther from an intersection point of the second emission surface and the optical axis, along an optical axis direction, than an end of the transmission suppression portion along the optical axis direction, and the lens member overlaps with the entire transmission suppression portion in the optical axis direction so as to cover the transmission suppression portion.

2. The steering wheel according to claim 1, wherein the transmission suppression portion is positioned between the lens member and the light source in the optical axis direction.

3. The steering wheel according to claim 1, wherein at least one engaging claw is positioned on an outer peripheral surface of the transmission suppression portion, at least one engaging hole is provided in the lens member, and the at least one engaging claw is configured to be engaged with the at least one engaging hole in an assembled state of the steering wheel.

4. The steering wheel according to claim 1, wherein the second emission surface of the lens member forms at least a portion of an outer surface of the steering wheel.

5. The steering wheel according to claim 1, further comprising:

a base member to which the lens member and a substrate having the light source are mounted, the base member holding the substrate and the lens member, wherein the transmission suppression portion is configured as a part of the base member.

6. The steering wheel according to claim 5, wherein the transmission suppression portion surrounds the side surface of the light passage portion over entire circumference of the light passage portion and is in contact with the side surface of the light passage portion.

7. A steering wheel comprising:

a light source;

a light guide member having a light passage portion and an emission end surface emitting light from the light source;

a transmission suppression portion and covering a portion of a side surface of the light passage portion;

a lens member receiving light from the light guide member and emitting the received light from a second emission surface; and an other member being in contact with a peripheral portion of the lens member; wherein, a point on an optical axis of light emitted from the emission end surface and on the emission end surface is closer to an intersection point of the second emission surface and the optical axis, along an optical axis direction, than both an end of the transmission suppression portion and a point of contact between the peripheral portion and the other member in the optical axis direction, and the transmission suppression portion and the side surface of the light passage portion along the optical axis direction are directly adjacent to each other without any intervening member such that the transmission suppression portion contacts at least a part of the side surface of the light passage portion.

8. The steering wheel according to claim 7, wherein the other member is a leather member forming at least a portion of an outer surface of the steering wheel.

9. The steering wheel according to claim 7, wherein the transmission suppression portion is positioned between the lens member and the light source in the optical axis direction.

10. The steering wheel according to claim 7, wherein at least one engaging claw is positioned on an outer peripheral surface of the transmission suppression portion, at least one engaging hole is provided in the lens member, and the at least one engaging claw is configured to be engaged with the at least one engaging hole in an assembled state of the steering wheel.

11. The steering wheel according to claim 7, wherein the second emission surface of the lens member forms at least a portion of an outer surface of the steering wheel.

12. The steering wheel according to claim 7, further comprising:

a base member to which the lens member and a substrate having the light source are mounted, the base member holding the substrate and the lens member, wherein the transmission suppression portion is configured as a part of the base member.

13. The steering wheel according to claim 12, wherein the transmission suppression portion surrounds the side surface of the light passage portion over entire circumference of the light passage portion and is in contact with the side surface of the light passage portion.

* * * * *